(No Model.)
J. A. LOMBAS.
CENTRIFUGAL FILTER.
No. 601,973. Patented Apr. 5, 1898.
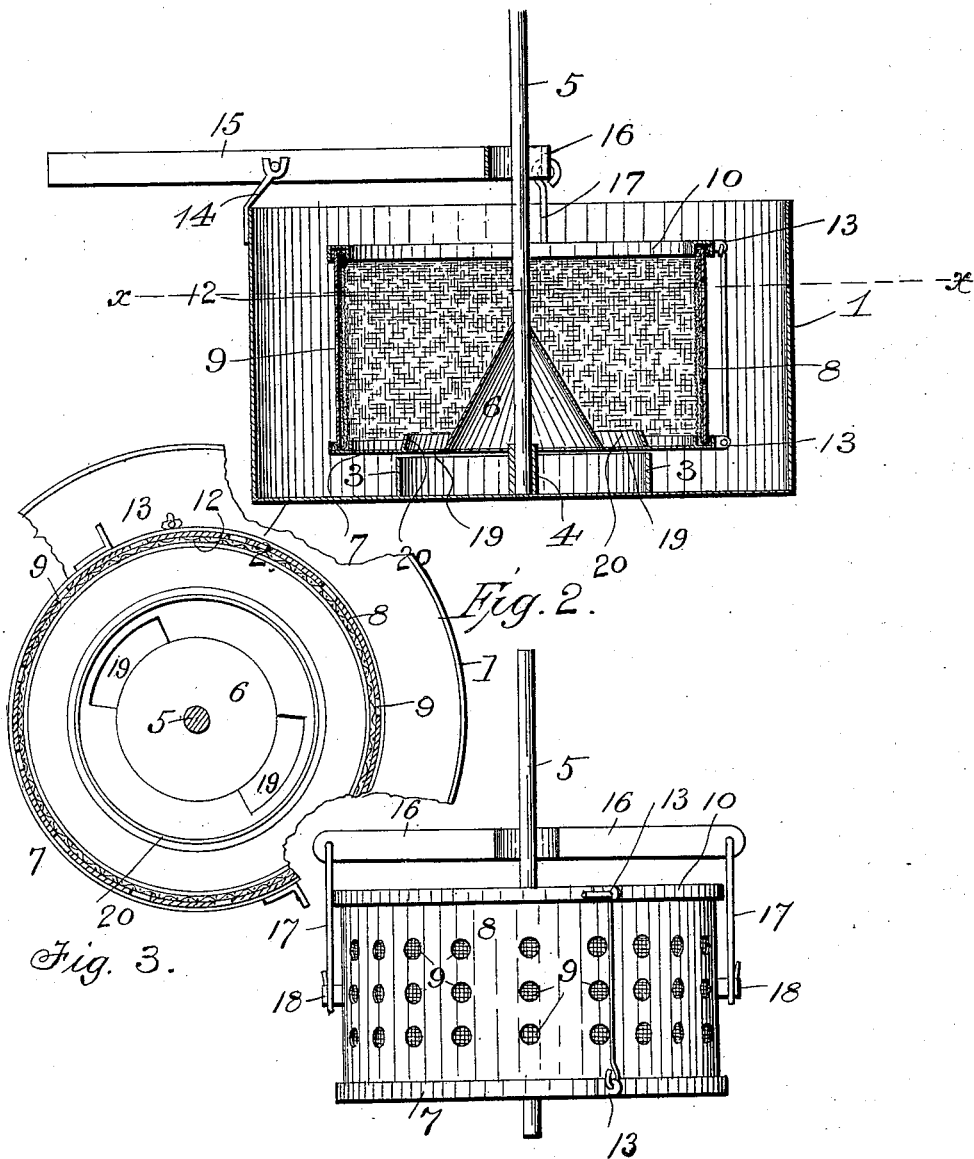
Witnesses:
Franck L. Ourand
W. L. Coombs
Inventor:
Joseph A. Lombas
by Louis Bagger & Co.
Attorneys

UNITED STATES PATENT OFFICE.

JOSEPH ARMAN LOMBAS, OF LOCKPORT, LOUISIANA, ASSIGNOR OF ONE-HALF TO ERNEST AMIDEE BOUDREAU, OF CYPRE MORT, LOUISIANA.

CENTRIFUGAL FILTER.

SPECIFICATION forming part of Letters Patent No. 601,973, dated April 5, 1898.

Application filed September 25, 1897. Serial No. 653,031. (No model.)

*To all whom it may concern:*

Be it known that I, JOSEPH ARMAN LOMBAS, a citizen of the United States, and a resident of Lockport, in the parish of La Fourche and State of Louisiana, have invented certain new and useful Improvements in Centrifugal Apparatus for Filtering Cane-Juice; and I do hereby declare that the following is a full, clear, and exact description of the invention, which will enable others skilled in the art to which it appertains to make and use the same, reference being had to the accompanying drawings, which form a part of this specification.

My invention relates to centrifugal apparatus for filtering cane-juice; and its object is to provide an improved construction of the same which shall possess superior advantages with respect to efficiency in operation.

The invention consists in the novel construction and combination of parts hereinafter fully described and claimed.

In the accompanying drawings, Figure 1 is a central longitudinal section of an apparatus constructed in accordance with my invention. Fig. 2 is an elevation of the revolving or rotating filtering vessel removed. Fig. 3 is a detail horizontal section on the line *x x*, Fig. 1, showing the openings in the bottom of the filtering vessel.

In the said drawings the reference-numeral 1 designates a cylindrical casing closed at the bottom and open at the top. Formed in said bottom 2 is an annular flange 3 for a purpose hereinafter described. Secured centrally to said bottom is a socket 4 for receiving the lower end of a rotatable shaft 5. This shaft is secured to a cone 6, which in turn is secured to the bottom 7 of a drum 8, formed with a number of perforations 9. The numeral 10 designates a ring removably secured to the said drum. The bottom 7 is also removably secured to said drum, and between the upper and lower ends of said drum and the ring and bottom, respectively, is secured the upper and lower edges of a filtering-cloth 12, thus forming a filtering vessel. The numeral 13 designates eyes secured to the outer edges of said ring and bottom, with which engage hooked rods for holding the ring and bottom in place.

Pivoted to lugs 14 at the upper end of the casing 1, is a lever 15 provided at its inner end with outwardly-extending arms 16, provided with downwardly-depending hooked rods 17, which engage with lugs 18 on the drum 8. By actuating this lever the filtering vessel can be elevated.

In the bottom of the filtering vessel are formed holes 19 for facilitating the discharge of the impurities left in the filtering vessel. The bottom of the filtering vessel is also provided with an upwardly-extending annular flange 20.

The purpose of the flange 3 is to prevent the juice fed to the drum from escaping through the holes 19 into the sediment-receptacle formed by the flange 20.

The bottom, at its edge, and the top ring are formed with grooves with which the top and bottom of the drum and the edges of the filtering-cloth engage.

In operation the juice is fed to the drum between its inner side and the flange 3 and the drum rapidly rotated, causing the juice to be expelled through the filtering-cloth and the openings in the drum to the casing, from whence it escapes through an opening (not shown) in the bottom. The sediment will fall into the space between the flange 3 and the cone and escape through the openings 19 into the receptacle formed by the flange 20. The filtering-cloth may be removed and replaced by a new one by elevating the drum by means of the lever and removing the top ring and the bottom of the drum. The drum can be cleaned by admitting steam thereto.

Having thus fully described my invention, what I claim is—

1. In an apparatus for filtering cane-juice, the combination with the casing, of the rotatable perforated drum located therein provided with a removable bottom and a removable top ring, the removable filtering-cloth on the inner side of the drum, the edges of which are inserted in grooves in said bottom and ring, and the hooks pivoted to said bottom and engaging with eyes secured to the ring for connecting and holding said bottom and ring in place, substantially as described.

2. In an apparatus for filtering cane-juice, the combination with the casing, the rotatable shaft, and the annular flange in the bottom of said casing, of the perforated drum secured to said shaft, the bottom of which is formed with discharge-openings, the filtering-cloth, at the inner side of said drum, the annular flange on the bottom of said drum outside of said openings, the cone secured to said shaft, and the pivoted lever, the inner end of which is connected with the drum, substantially as described.

In testimony that I claim the foregoing as my own I have hereunto affixed my signature in presence of two witnesses.

JOSEPH ARMAN LOMBAS.

Witnesses:
 JAMES EVANS,
 PAUL A. BADEAUX.